United States Patent
Han et al.

(10) Patent No.: US 10,218,428 B2
(45) Date of Patent: Feb. 26, 2019

(54) RECEIVER AND DETECTING METHOD THEREOF

(71) Applicants: Samsung Electronics Co., Ltd., Suwon-si (KR); Kyungpook National University Industry-Academic Cooperation Foundation, Daegu (KR)

(72) Inventors: Sun-bum Han, Goyang-si (KR); Bong Gyun Jo, Daegu (KR); Dong Seog Han, Daegu (KR); Won-sang Kim, Seoul (KR); In-kwon Paik, Suwon-si (KR); Dong-hoon Lee, Suwon-si (KR); Yong-deok Chang, Suwon-si (KR)

(73) Assignees: SAMSUNG ELECTRONICS CO., LTD., Suwon-si (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 15/468,713

(22) Filed: Mar. 24, 2017

(65) Prior Publication Data
US 2017/0346546 A1     Nov. 30, 2017

(30) Foreign Application Priority Data
May 25, 2016     (KR) ........................ 10-2016-0063998

(51) Int. Cl.
*H04B 7/08* (2006.01)
*H04L 7/00* (2006.01)

(52) U.S. Cl.
CPC ......... *H04B 7/0885* (2013.01); *H04B 7/0874* (2013.01); *H04L 7/0087* (2013.01)

(58) Field of Classification Search
CPC ........................... H04B 7/0885; H04L 7/0087
See application file for complete search history.

(56) References Cited

U.S. PATENT DOCUMENTS

| | | | |
|---|---|---|---|
| 2004/0131109 A1 | 7/2004 | Kim et al. | |
| 2006/0126753 A1* | 6/2006 | Jwa | H04B 1/71052 375/267 |
| 2009/0052591 A1* | 2/2009 | Chen | H04L 25/03318 375/341 |
| 2010/0020907 A1* | 1/2010 | Rezvani | H04B 7/0848 375/347 |
| 2010/0103987 A1* | 4/2010 | Zeira | H04B 7/0613 375/148 |
| 2011/0200089 A1 | 8/2011 | Umeda et al. | |

(Continued)

FOREIGN PATENT DOCUMENTS

| JP | 2002-540728 A | 11/2002 |
|---|---|---|
| JP | 5644475 B2 | 12/2014 |

(Continued)

*Primary Examiner* — Dac V Ha
(74) *Attorney, Agent, or Firm* — Staas & Halsey LLP (57) ABSTRACT

A receiver and a detecting method thereof are provided. The receiver includes a plurality of antennas receiving a transmitted signal through multiple paths; and an equalizer collecting a plurality of sample signals by reflecting signals received in other antennas in the signals received in the plurality of antennas, and detecting a symbol of the transmitted signal by combining the plurality of sample signals that are collected with each other.

14 Claims, 8 Drawing Sheets

(56) References Cited

U.S. PATENT DOCUMENTS

2014/0153674 A1\* 6/2014 Stratigos, Jr. ........... H04L 27/06
 375/340
2015/0195004 A1 7/2015 Botha et al.

FOREIGN PATENT DOCUMENTS

| KR | 10-2001-0099769 | 11/2001 |
| KR | 10-0963208 B1 | 6/2010 |
| KR | 10-1068639 B1 | 9/2011 |
| WO | WO 00/25447 | 5/2000 |
| WO | WO 00/59168 | 10/2000 |

\* cited by examiner

Step 2
$b_1 = h_2[l_1]y_1 - h_1[l_1]y_2$

|  | $b_1[1]$ | $b_1[2]$ | $b_1[3]$ | $b_1[4]$ |
|---|---|---|---|---|
| 1st path | 0 | $h_2[l_1]h_1[l_2]x[1]$ $-h_1[l_1]h_2[l_2]x[1]$ | $h_2[l_1]h_1[l_2]x[2]$ $-h_1[l_1]h_2[l_2]x[2]$ | $h_2[l_1]h_1[l_2]x[3]$ $-h_1[l_1]h_2[l_2]x[3]$ |
| 2nd path | | | $h_2[l_1]h_1[l_3]x[1]$ $-h_1[l_1]h_2[l_3]x[1]$ | $h_2[l_1]h_1[l_3]x[2]$ $-h_1[l_1]h_2[l_3]x[2]$ |

$b_2 = h_2[l_2]y_1 - h_1[l_2]y_2$

|  | $b_2[1]$ | $b_2[2]$ | $b_2[3]$ | $b_2[4]$ |
|---|---|---|---|---|
| 3rd path | $h_2[l_2]h_1[l_1]x[1]$ $-h_1[l_2]h_2[l_1]x[1]$ | $h_2[l_2]h_1[l_1]x[2]$ $-h_1[l_2]h_2[l_1]x[2]$ | $h_2[l_2]h_1[l_1]x[3]$ $-h_1[l_2]h_2[l_1]x[3]$ | $h_2[l_2]h_1[l_1]x[4]$ $-h_1[l_2]h_2[l_1]x[4]$ |
| 1st path | | | $h_2[l_2]h_1[l_3]x[1]$ $-h_1[l_2]h_2[l_3]x[1]$ | $h_2[l_2]h_1[l_3]x[2]$ $-h_1[l_2]h_2[l_3]x[2]$ |

$b_3 = h_2[l_3]y_1 - h_1[l_3]y_2$

|  | $b_3[1]$ | $b_3[2]$ | $b_3[3]$ | $b_3[4]$ |
|---|---|---|---|---|
| 2nd path | $h_2[l_3]h_1[l_1]x[1]$ $-h_1[l_3]h_2[l_1]x[1]$ | $h_2[l_3]h_1[l_1]x[2]$ $-h_1[l_3]h_2[l_1]x[2]$ | $h_2[l_3]h_1[l_1]x[3]$ $-h_1[l_3]h_2[l_1]x[3]$ | $h_2[l_3]h_1[l_1]x[4]$ $-h_1[l_3]h_2[l_1]x[4]$ |
| 3rd path | | $h_2[l_3]h_1[l_2]x[1]$ $-h_1[l_3]h_2[l_2]x[1]$ | $h_2[l_3]h_1[l_2]x[2]$ $-h_1[l_3]h_2[l_2]x[2]$ | $h_2[l_3]h_1[l_2]x[3]$ $-h_1[l_3]h_2[l_2]x[3]$ |

FIG. 4C

Step 3

FIG. 6

RECEIVER AND DETECTING METHOD THEREOF

CROSS-REFERENCE TO RELATED APPLICATIONS

This application claims priority from Korean Patent Application No. 10-2016-0063998, filed on May 25, 2016, in the Korean Intellectual Property Office, the disclosure of which is incorporated herein by reference in its entirety.

BACKGROUND

Field

Apparatuses and methods consistent with the present disclosure relate to a receiver and a detecting method thereof, and more particularly, to a receiver capable of improving reception performance using all gains of multiple paths, and a detecting method thereof.

Description of the Related Art

In most of mobile communication environments, a receiver uses several types of equalizers in order to solve damage to a signal generated by frequency selectivity of radio channels. The purpose of the equalizer is to compensate for the frequency selectivity of the channels to reconstruct the signal so as to be close to a form of an original transmitted signal.

Conventionally, a time domain equalizer such as a zero-forcing (ZF) equalizer, a minimum mean square error (MMSE) equalizer, a least mean square (LMS) equalizer, or a decision feedback equalization (DFE) equalizer has been used. However, since the conventional time domain equalizer constantly equalizes channels depending on a main path, the conventional time domain equalizer has a problem that it may not use a unique gain of a multipath.

For example, the ZF equalizer has a problem that a noise level rises after an equalizing operation. In addition, the MMSE equalizer may be implemented by a discrete finite impulse response (FIR) filter having a plurality of filter taps to which sampled received signals are applied, but has a problem that it uses many data and has high complexity.

In addition, a conventional frequency domain equalizer has a problem that calculation corresponds to circular convolution and calculation for determining filter taps is complicated, such that insertion of a cyclic prefix (CP) is required. However, the conventional frequency domain equalizer has a problem that band efficiency is decreased due to the insertion of the CP.

SUMMARY

Exemplary embodiments overcome the above disadvantages and other disadvantages not described above. Also, the present embodiments are not required to overcome the disadvantages described above, and an exemplary embodiment may not overcome any of the problems described above.

The present disclosure provides a receiver capable of removing inter-symbol interference (ISI) using a multipath diversity and improving a signal to noise ratio (SNR) of a signal from which ISI is removed through maximum ratio combining (MRC), and a detecting method thereof.

According to an aspect of the present disclosure, a receiver includes: a plurality of antennas each receiving a transmitted signal through multiple paths; and an equalizer collecting a plurality of sample signals by reflecting signals received in other antennas in each of the signals received in each of the plurality of antennas, and detecting a symbol of the transmitted signal by combining the plurality of sample signals that are collected with each other.

According to another aspect of the present disclosure, a detecting method of a receiver includes: receiving a transmitted signal through multiple paths in a plurality of antennas; collecting a plurality of sample signals by reflecting signals received in other antennas in each of the signals received in each of the plurality of antennas; and detecting a symbol of the transmitted signal by combining the plurality of sample signals that are collected with each other.

According to the diverse exemplary embodiments of the present disclosure as described above, the receiver may remove ISI using a multipath gain or improve a signal to noise ratio (SNR) using a partial multipath gain.

BRIEF DESCRIPTION OF THE DRAWING FIGURES

The above and/or other aspects of the present embodiments will be more apparent by describing certain exemplary embodiments with reference to the accompanying drawings, in which.

DETAILED DESCRIPTION OF THE EXEMPLARY EMBODIMENTS

Hereinafter, exemplary embodiments of the present disclosure will be described in detail with reference to the accompanying drawings. In describing the present disclosure, when it is decided that a detailed description for the known functions or configurations related to the present disclosure may unnecessarily obscure the gist of the present disclosure, the detailed description therefor will be omitted. In addition, terms to be described below are defined in consideration of functions in the present disclosure, and may be construed in different ways by users, operators, practices, or the like. Therefore, these terms should be defined on the basis of the contents throughout the present specification.

Terms including ordinal numbers such as 'first', 'second', and the like, may be used to describe various components. However, these components are not limited by these terms. The terms are used only to distinguish one component from another component. For example, a 'first' component may be named a 'second' component and the 'second' component may also be similarly named the 'first' component, without departing from the scope of the present disclosure. A term 'and/or' includes a combination of a plurality of related items or any one of the plurality of related items.

Terms used in the present specification are used to describe exemplary embodiments, and are not intended to restrict and/or limit the present disclosure. Singular forms are intended to include plural forms unless clearly interpreted otherwise in a context. It will be understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Figure 1:
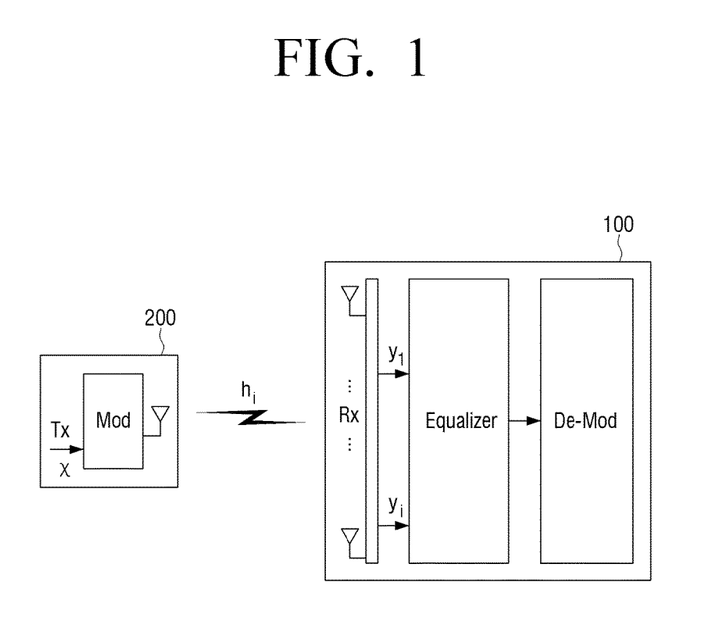
FIG. 1 is a view illustrating a communication system including a receiver according to an exemplary embodiment of the present disclosure.

FIG. 1 is a view illustrating a communication system 1000 according to an exemplary embodiment of the present disclosure. In an exemplary embodiment of FIG. 1, a single-input multi-output (SIMO) communication system in which a transmitter 200 transmits a signal using a single antenna and a receiver 100 receives the signal using a plurality of antennas is illustrated. Hereinafter, equalization and detection of received signals in the SIMO communication system as illustrated in FIG. 1 will be described. However, an equalizing and detecting method of received signals to be described below may also be applied to another kind of communication system (for example, a multi-input multi-output (MIMO) communication system) in which multiple paths are used and a plurality of receive (Rx) antennas are present.

Referring to FIG. 1, the transmitter 200 may modulate a transmitted signal x and transmit the modulated transmitted signal. For example, the transmitter 200 may perform channel coding, inverse fast Fourier transform (IFFT), or the like, and then, transmit the transmitted signal.

In addition, the receiver 100 may receive the transmitted signal transmitted through multiple paths. The receiver 100 may amplify received signals $y_1, \ldots, y_i$ received in a plurality of antennas 110. In addition, the receiver 100 may perform equalization, detection, demodulation, and the like, using the amplified received signals.

The communication system 1000 illustrated in FIG. 1 may be implemented by a mobile communication system such as a long term evolution (LTE) system, a broadcasting communication system, or the like. For example, in the case in which the communication system 1000 is implemented by the mobile communication system, the transmitter 200 may be a base station apparatus, and the receiver 100 may be a user terminal apparatus.

Figure 2:
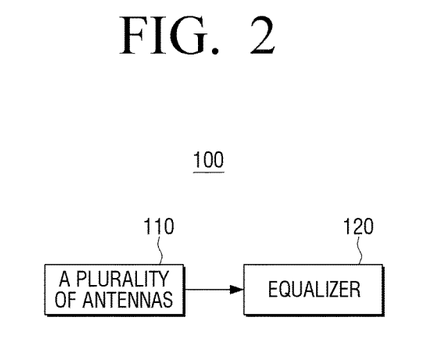
FIG. 2 is a schematic block diagram for describing components of a receiver according to an exemplary embodiment of the present disclosure.
Figure 3:
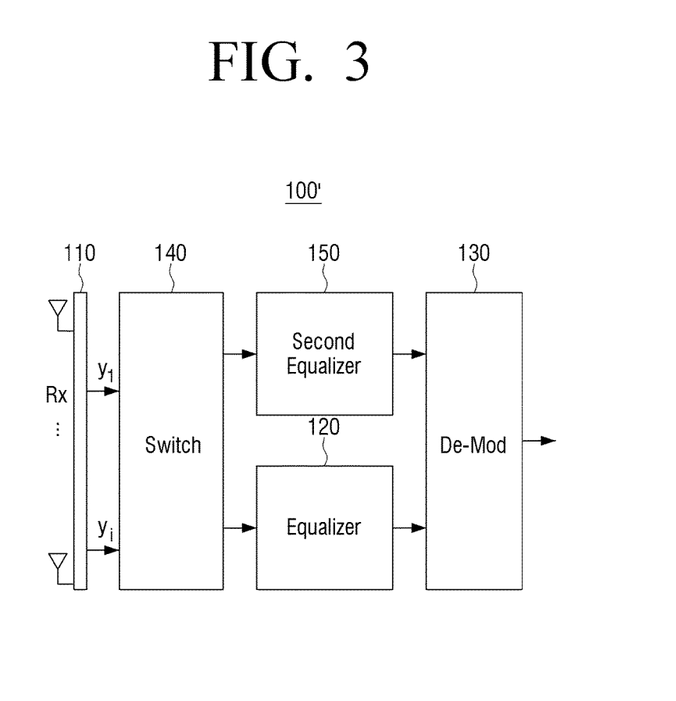
FIG. 3 is a block diagram for describing components of a receiver according to another exemplary embodiment of the present disclosure in detail.

FIG. 2 is a schematic block diagram for describing components of a receiver 100 according to an exemplary embodiment of the present disclosure. Referring to FIG. 2, the receiver 100 may include a plurality of antennas 110 and an equalizer 120. Although only the plurality of antennas 110 and the equalizer 120 are illustrated in an exemplary embodiment of FIG. 2, the receiver 100 may additional include a component such as a demodulator 130 as illustrated in FIG. 3.

The plurality of antennas 110 may each receive the transmitted signal transmitted through the multiple paths. That is, in the case in which N antennas 110-1, ..., 110-N receive the transmitted signal, N received signals may be generated.

Since the receiver 100 uses the plurality of antennas 110, it may obtain a receive diversity. In addition, the receiver 100 may additionally obtain a spatial diversity or a polarization diversity depending on a distance between the plurality of antennas 110 and polarization direction use of each antenna.

The equalizer 120 may collect a plurality of sample signals for the transmitted signal using each of the signals received in each of the plurality of antennas 110. For example, the equalizer 120 may reflect signals received in other antennas in each of the signals received in each of the plurality of antennas 110 to remove inter-symbol interference (ISI). Through this process, the equalizer 120 may collect the plurality of sample signals in which all channel gains of the multiple paths are reflected.

The equalizer 120 may collect the plurality of sample signals per preset time unit of the transmitted signal. For example, the equalizer 120 may perform a collection operation per symbol or subframe unit of the transmitted signal.

In more detail, the equalizer 120 may collect a plurality of sample signals for a first symbol of the transmitted signal from first symbols of each of the signals received in each of the plurality of antennas 110. In addition, the equalizer 120 may collect the plurality of sample signals for the first symbol of the transmitted signal by reflecting signals received in other antennas in the other symbols of each of the received signals.

In addition, the equalizer 120 may collect the plurality of sample signals by combining every two of a plurality of signals received in each of the plurality of antennas 110 with each other. For example, in the case in which the signals are received in N antennas, respectively, the equalizer 120 may repeat a sample signal collecting process by a combination $NC2$.

In addition, the equalizer 120 may combine the plurality of sample signals that are collected with each other to detect a symbol of the transmitted signal. The equalizer 120 may combine the plurality of sample signals that are collected with each other using channel gain information of each of the plurality of antennas 110. For example, the equalizer 120 may combine the plurality of sample signals that are collected with each other in a maximum ratio combining (MRC) scheme to improve a signal to noise ratio (SNR) of the detected signal.

A detailed operation of the equalizer 120 will be again described below with reference to FIGS. 4A to 5.

FIG. 3 is a block diagram for describing components of a receiver 100' according to another exemplary embodiment of the present disclosure in detail. Referring to FIG. 3, the receiver 100' may further include a switch 140 and a second equalizer 150 as compared with the receiver 100 according to an exemplary embodiment of FIGS. 1 and 2.

Since the plurality of antennas 110 and the equalizer 120 have been described with reference to FIG. 2, a description therefor will be omitted.

The demodulator 130 may demodulate the transmitted signal using a symbol detected in the equalizer 120 or a symbol detected in the second equalizer 150.

The receiver 100' according to another exemplary embodiment of the present disclosure may perform equalization and detection by selecting one of the equalizer 120 using a multipath diversity and the second equalizer 150 that may be implemented by a zero-forcing (ZF) equalizer, a minimum mean square error (MMSE) equalizer, a least mean square (LMS) equalizer, a decision feedback equalization (DFE) equalizer, or the like, that is generally used in the related art.

The second equalizer 150 constantly equalizes channels depending on a main path, which is one of multiple paths. Therefore, all gains of the multiple paths may not be used in the second equalizer 150 unlike the equalizer 120.

The switch 140 may selectively transfer received signals to one of the equalizer 120 and the second equalizer 150. For example, the switch 140 may compare error values of symbols detected in each of the equalizer 120 and the second equalizer 150 with each other using a training sequence. In addition, the switch 140 may transfer the received signals to one, having a smaller error value, of the equalizer 120 and the second equalizer 150. For example, the training sequence may be a pseudo noise (PN) code sequence included in the transmitted signal.

For the purpose of this operation, the switch 140 may first transfer only signals corresponding to the training sequence to the equalizer 120 and the second equalizer 150, and may receive fed-back detected values. The switch 140 may perform this operation through a processor included in a circuit itself of the switch 140, or an operation of comparing the error values with each other and an operation of controlling the switch 140 may be performed in a main processor (not illustrated) generally controlling the receiver 100.

The switch 140 has been illustrated as a component simply connecting the plurality of antennas 110 to the equalizer 120 and the second equalizer 150 in FIG. 3, but is not limited thereto. For example, the switch 140 may also be implemented by a component connecting the equalizer 120 and the second equalizer 150 to the demodulator 130. In this case, the switch 140 may selectively transfer one of the signals detected in the equalizer 120 and the second equalizer 150 to the demodulator 130 in order to use the signal for demodulation.

Hereinafter, operations of collecting and combining a plurality of sample signals with each other by the receiver 100 according to an exemplary embodiment of the present disclosure will be described. The equalizer 120 may perform operations of collecting and combining sample signals with each other using a multipath diversity. Although a case in which algorithm operations are performed in the equalizer 120 has been hereinafter described, some or all of the algorithm operations may also be performed in a main processor (not illustrated) of the receiver 100.

A case in which delays of multiple paths of each of the plurality of antennas 110 are the same as each other and a case in which delays of multiple paths of each of the plurality of antennas 110 are different from each other will be described with reference to FIGS. 4 and 5, respectively. First, a signal $y_i[k]$ received in an i-th antenna of the receiver 100 having N antennas may be represented by Equation 1.

$$y_i[k] = \sum_{j=1}^{B_j} h_i[l_j]x[k-l_j] + n_i[k], \quad i = 1, 2, \ldots, N \quad \text{[Equation 1]}$$

Here, k is a symbol index, $B_i$ is the number of multiple paths entering the i-th antenna, $l_j$ is a j-th path of the multiple paths, and $n_i[k]$ is additive white Gaussian noise (AWGN).

For convenience of explanation, in FIGS. 4A to 4C, an example in which the numbers of paths of each of the plurality of antennas 110 are the same as each other (three) and delays of channels are the same as each other (B1=B2=3) will be described. In an example of FIGS. 4A to 4C, it has been assumed that there is no AWGN.

Figure 4A:
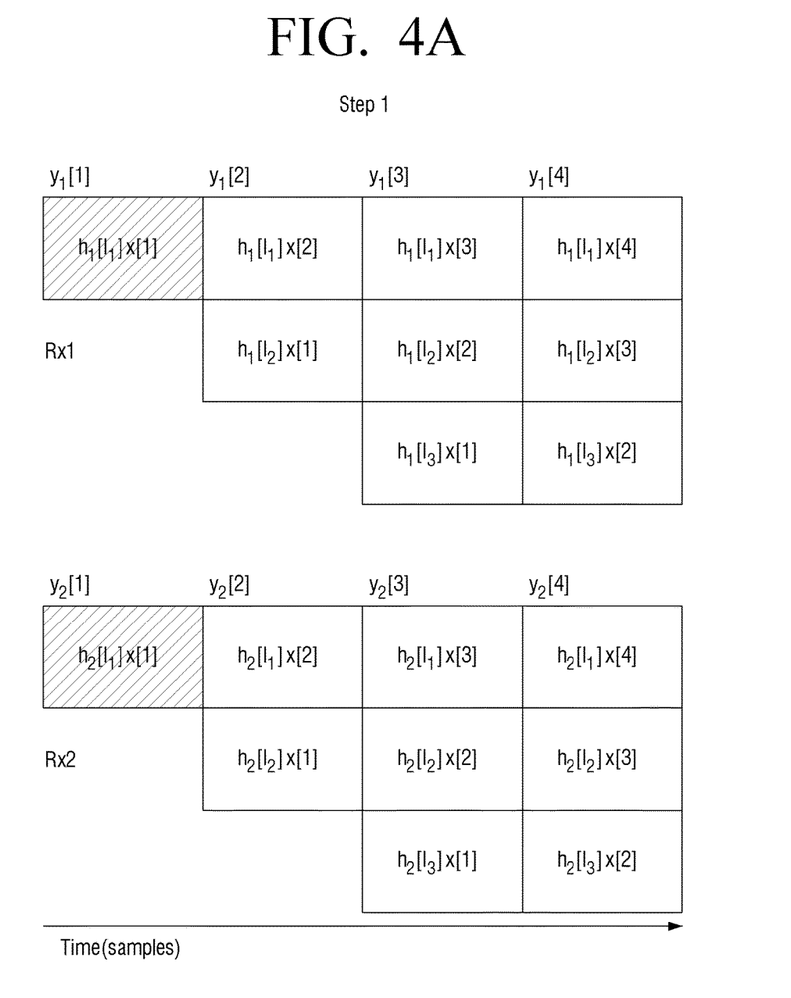
FIGS. 4A to 4C are views for describing an exemplary embodiment in the case in which delays of the respective channels are the same as each other.
Figure 5:
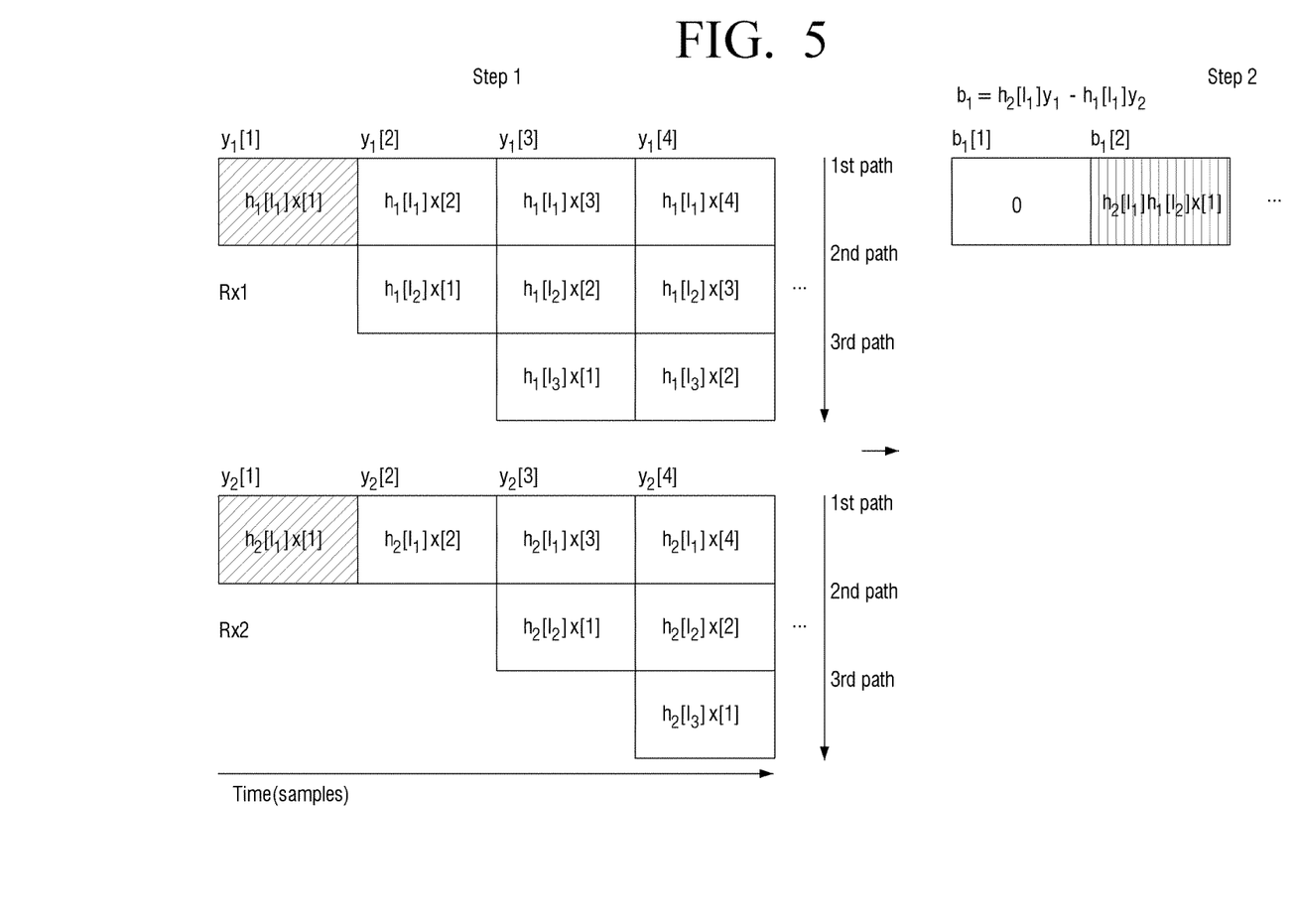
FIG. 5 is a view for describing an exemplary embodiment in the case in which delays of the respective channels are different from each other.

Referring to FIG. 4A, each of symbols of signals received in a first antenna Rx 1 and a second antenna Rx2 is illustrated. For example, $y_1[2]$ means a second symbol of the signal received in the first antenna Rx 1. In addition, in FIG. 4A, for convenience, components of the received signals are illustrated for each path. For example, $y_1[2]$ corresponds to $h_1[l_1]x[2]+h_1[l_2]x[1]$.

The equalizer 120 may collect a plurality of sample signals for a first symbol (x[1]) of a transmitted signal from first symbols of two signals (signals received in Rx 1 and Rx 2) of signals received in each of the plurality of antennas 110.

$$y_1[1]=h_1[l_1]x[1], \quad y_2[1]=h_2[l_1]x[1]$$

Figure 4B:
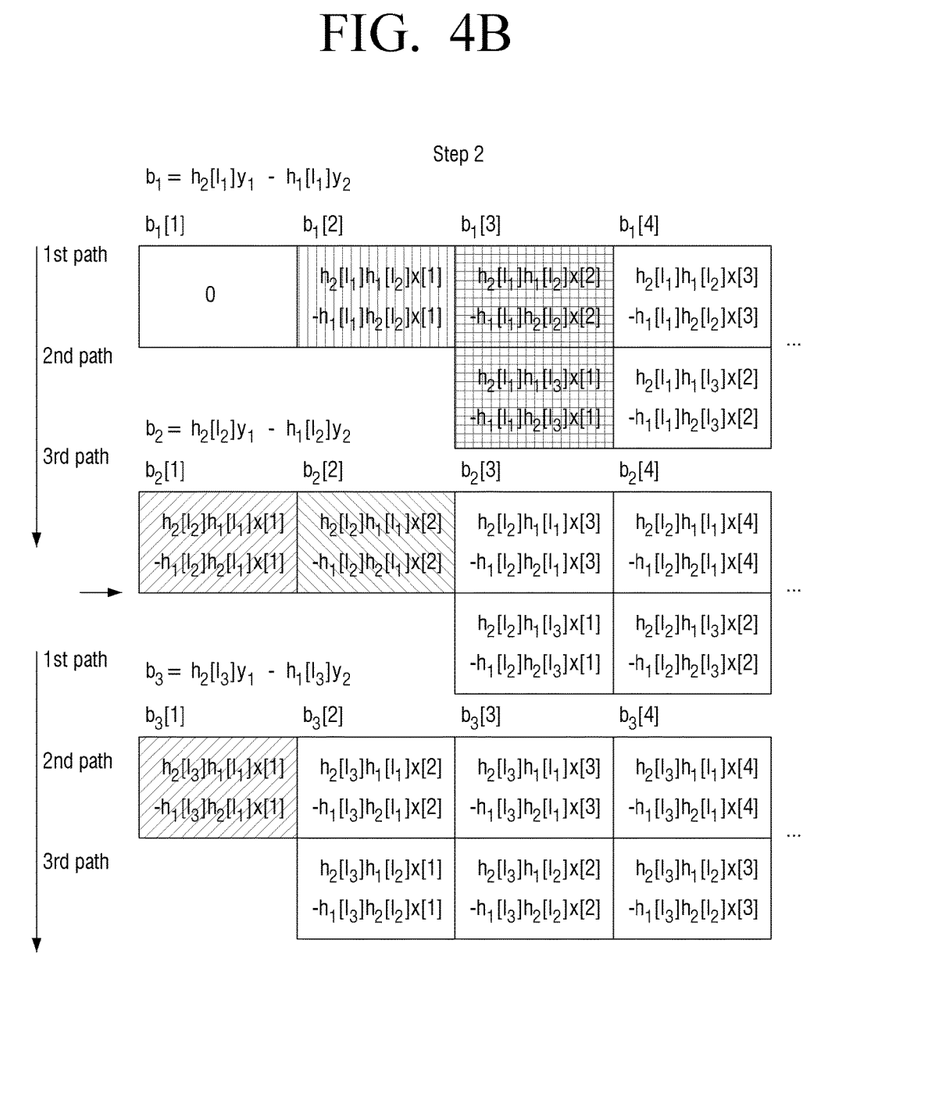
Figure 4C:
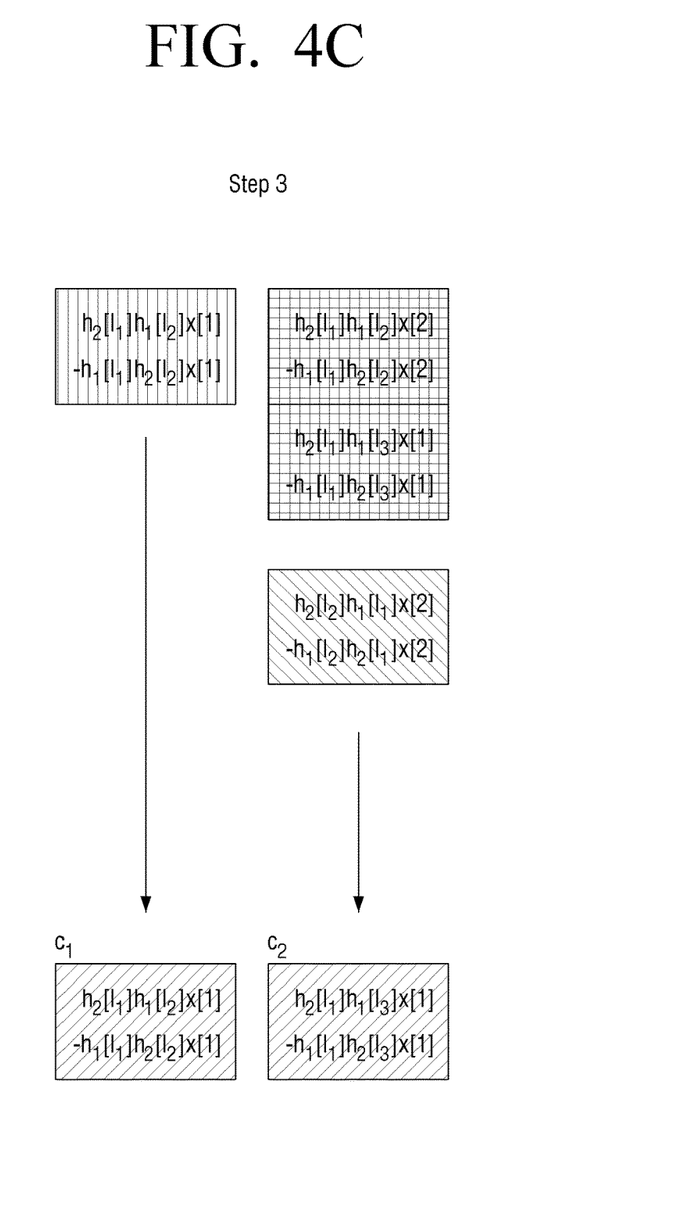

In addition, the equalizer 120 may derive $b_j$ and $c_j$, which are parameters for the first symbol of the transmitted signal, as illustrated in FIGS. 4B and 4C, using the other symbols of the received signals. The equalizer 120 may collect sample signals for the first symbol (x[1]) of the transmitted signal using the parameters $b_j$ and $c_j$.

Referring to FIG. 4B, the equalizer 120 may derive three $b_j$ parameters, similar to the number of multiple paths.

$$b_1h_2[l_1]y_1 - h_1[l_1]y_2 = 0$$

$$b_2 = h_2[l_2]y_1 - h_1[l_2]y_2$$

$$b_3 = h_2[l_3]y_1 - h_1[l_3]y_2$$

In addition, the equalizer 120 may derive $c_j$ parameters as illustrated in FIG. 4C using the derived $b_j$ parameters.

$$c_1 = b_1[2] = h_2[l_1]h_1[l_2]x[1] - h_1[l_1]h_2[l_2]x[1]$$

$$c_2b_1[3] + b_2[2]h_2[l_1]h_1[l_3]x[1] - h_1[l_1]h_2[l_3]x[1]$$

In addition, the equalizer 120 may combine the plurality of sample signals collected as described above with each other to improve a signal to noise ratio. For example, the equalizer 120 may combine the plurality of sample signals with each other in an MRC scheme.

$$\tilde{x}[1] = h_1[l_1]^*y_1[1] + h_2[l_1]^*y_2[1] + $$
$$(h_2[l_2]h_1[l_1] - h_1[l_2]h_2[l_1])^*b_2[1] + (h_2[l_3]h_1[l_1] - h_1[l_3]h_2[l_1])^*b_3[1] + $$
$$(h_2[l_1]h_1[l_2] - h_1[l_1]h_2[l_2])^*c_1 + (h_2[l_1]h_1[l_3] - h_1[l_1]h_2[l_3])^*c_2$$

The case of FIGS. 4A to 4C as described above may be extended to a general case as follows.

The equalizer 120 may collect the sample signals for the first symbol (x[1]) of the transmitted signal from first symbols ($y_1[1], y_2[1], \ldots, y_N[1]$) received in all of the plurality of antennas.

In addition, the equalizer 120 may remove ISI in order to collect sample signals for x[1] in the received other symbols. The following generalized Equation may also be applied to a case in which there is an AWGN.

$$b_j = h_2[l_j]y_1 - h_1[l_j]y_2, \quad b_1[1] = 0, \quad j = 1, 2, \ldots, B$$

$$c_j[k] = \sum_{m=1}^{j-1} b_m[l_{j+1} - (l_m - l_1) + k - 1]$$

The equalizer 120 may perform MRC in order to improve a signal to noise ratio using the plurality of sample signals collected as described above.

$$\tilde{x}[1] = h_1^*[l_1]y_1[1] + h_2^*[l_1]y_2[1] + \sum_{j=2}^{B} \alpha_j^* b_j[1] + \sum_{j=1}^{B-1} \beta_j^* c_j$$

Here, parameters α and β may be defined as follows:

$$\alpha_j^* = (h_2[l_j]h_1[l_1] - h_1[l_j]h_2[l_1])^*$$

$\beta_j^* = (-\alpha_j)^*$.

When the number of antennas 110 is N, the equalizer 120 may select two of the plurality of antennas 110 and perform the operations of collecting and combining the sample signals with each other as described above. In addition, the equalizer 120 may repeatedly perform the same operation by a combination NC2. The equalizer 120 may perform detection as represented by Equation 2 using all of the collected sample signals.

$$x[1] = \operatorname{argmin}_x \left\| x[k] - \frac{\sum_{r=1}^{N C_2} \tilde{x}_r[1]}{N C_2} \right\| \quad \text{[Equation 2]}$$

Then, the equalizer 120 may remove the detected symbol from the signal received in each of the plurality of antennas, and repeat collecting and combining processes to detect the next symbol (x[2]) of the detected symbol.

Unlike the case in which the delays are the same as each other as described above, in the case in which delays of channels of each of the plurality of antennas 110 are different from each other, a plurality of sample signals that may be collected are restrictive. Referring to FIG. 5, the number of sample signals for the first symbol (x[1]) of the transmitted signal that may be collected in the equalizer 120 using two antennas is three. The number of sample signals that may be collected is smaller than in the case in which the delays are the same as each other, but the equalizer 120 may combine the sample signals with each other in the same scheme to improve a signal to noise ratio.

In various exemplary embodiments of the present disclosure as described above, the equalizing and detecting operations may be performed using the multipath diversity. Therefore, all the gains of the multiple paths are used, such that reception performance of the receiver is improved.

Figure 6:
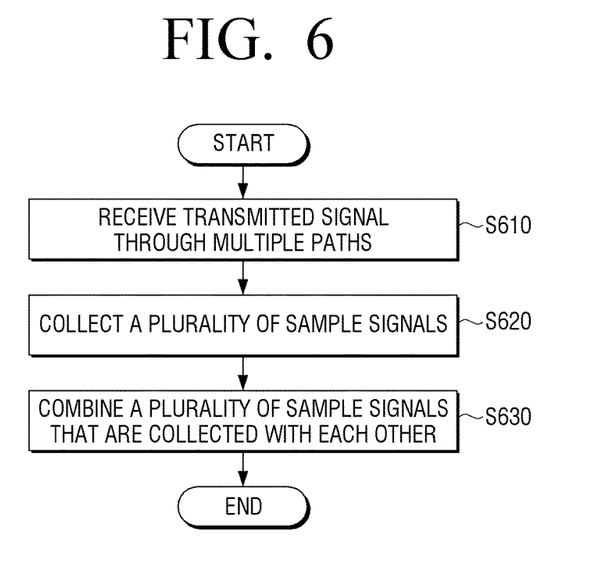
FIG. 6 is a flow chart for describing a detecting method of a receiver according to an exemplary embodiment of the present disclosure.

FIG. 6 is a flow chart for describing a detecting method of a receiver 100 according to an exemplary embodiment of the present disclosure.

The receiver 100 may be implemented by an apparatus including a plurality of antennas. The receiver 100 may receive a transmitted signal through multiple paths in the plurality of antennas (S610).

Then, the receiver 100 may collect a plurality of sample signals by reflecting signals received in other antennas in each of signals received in each of the plurality of antennas (S620). In detail, the receiver 100 may collect a plurality of sample signals for a first symbol of the transmitted signal using first symbols of each of the signals received in the plurality of antennas. In addition, the receiver 100 may remove ISI and collect the plurality of sample signals for the first symbol of the transmitted signal using the other symbols of each of the received signals.

Then, the receiver 100 may combine the plurality of sample signals that are collected with each other to detect a symbol of the transmitted signal (S630). Particularly, the receiver 100 may combine the plurality of sample signals with each other using channel gain information of each of the plurality of antennas 110.

The receiver 100 may remove the detected symbol from the signals received in each of the plurality of antennas, and repeat collecting and detecting processes to sequentially detect the next symbols of the detected symbol.

Since other various exemplary embodiments of the detecting method correspond to an exemplary embodiment of the receiver 100, a detailed description therefor will be omitted in order to avoid an overlapped description.

The methods described above may be implemented in a form of program commands that may be executed through various computer means and may be recorded in a computer-readable recording medium. The computer-readable recording medium may include a program command, a data file, a data structure or the like, alone or a combination thereof. The program commands recorded in the computer-readable recording medium may be especially designed and configured for the present disclosure or be known to those skilled in a field of computer software. Examples of the computer-readable recording medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler. The above-mentioned hardware device may be constituted to be operated as one or more software modules in order to perform an operation according to the present disclosure, and vice versa.

Although the present disclosure has been described with reference to the exemplary embodiments and the accompanying drawings, the present disclosure is not limited to the above-mentioned exemplary embodiments, but may be variously modified and altered from the above description by those skilled in the art to which the present disclosure pertains. Therefore, the scope of the present disclosure is not construed as being limited to the exemplary embodiments described above, but should be defined by the following claims as well as equivalents thereto.

What is claimed is:

1. A receiver comprising:
   a plurality of antennas, each antenna receiving a transmission signal through multiple paths, respectively; and
   a processor to implement an equalizer to:
      obtain a sample signal for each of a plurality of signals received through the plurality of antennas, by reflecting a channel gain of another antenna based on a signal received in other antennas among the plurality of antennas, and
      detect a symbol of the transmission signal by combining a plurality of sample signals obtained for the plurality of signals,
      wherein the equalizer combines the plurality of sample signals using channel gain information of the plurality of antennas.

2. The receiver as claimed in claim 1, wherein the equalizer is a first equalizer and the receiver further comprises:
   a second equalizer equalizing the plurality of signals received in the plurality of antennas depending on one of the multiple paths to detect a symbol of the transmission signal; and
   a demodulator demodulating the transmission signal using the symbol detected in the first equalizer or the symbol detected in the second equalizer.

3. The receiver as claimed in claim 2, wherein the demodulator compares an error value of the symbol detected in the first equalizer and an error value of the symbol detected in the second equalizer, and demodulates the transmission signal using a symbol having a smaller error value.

4. The receiver as claimed in claim 1, wherein to obtain the sample signal, the equalizer obtains a sample signal for a first symbol of the transmission signal, from among first symbols of the plurality of signals received through the plurality of antennas, and obtains the sample signal for the first symbol of the transmission signal by the reflecting in the other antennas other symbols of the received plurality of signals.

5. The receiver as claimed in claim 4, wherein the equalizer obtains the sample signal by combining every two of the plurality of signals received in the plurality of antennas.

6. The receiver as claimed in claim 5, wherein the equalizer obtains the sample signal for the first symbol ($x_1[1]$) of the transmission signal using the first symbols $\{y_1[1]$ and $y_2[1]\}$ of two of the signals received in two of the plurality of antennas and parameters ($b_j$ and $c_j$) for the first symbol obtained by the reflecting of the signals received in the other antennas in the other symbols through the following Equations:

$$b_j = h_2[l_j]y_1 - h_1[l_j]y_2, \quad b_1[1] = 0, \quad j = 1, 2, \ldots, B$$

$$c_j[k] = \sum_{m=1}^{j-1} b_m[l_{j+1} - (l_m - l_1) + k - 1]$$

$$\tilde{x}[1] = h_1^*[l_1]y_1[1] + h_2^*[l_1]y_2[1] + \sum_{j=2}^{B} \alpha_j^* b_j[1] + \sum_{j=1}^{B-1} \beta_j^* c_j$$

$$\alpha_j^* = (h_2[l_j]h_1[l_1] - h_1[l_j]h_2[l_1])^*, \quad \beta_j^* = (-\alpha_j)^*$$

where k is a symbol index, B is a number of the multiple paths, $h_i$ a channel gain of an i-th antenna of the plurality of antennas, and $l_j$ is a j-th path of the multiple paths, wherein k, B, i and j are integer.

7. The receiver as claimed in claim 1, wherein the equalizer removes the detected symbol from the plurality of signals received in the plurality of antennas, and repeats obtaining and combining processes to detect a next symbol of the detected symbol.

8. A detecting method of a receiver, comprising:
receiving, in a plurality of antennas, a transmission signal through multiple paths, respectively;
by a processor to cause,
collecting a plurality of sample signals, from among a plurality of signals received through the plurality of antennas, by reflecting a channel gain of another antenna based on a signal received in other antennas among the plurality of antennas, and
detecting a symbol of the transmission signal by combining the plurality of sample signals that are obtained for the plurality of signals,
wherein the plurality of sample signals is combined by using channel gain information of the plurality of antennas.

9. The detecting method of a receiver as claimed in claim 8, wherein by the processor further causes:
secondarily detecting a symbol of the transmission signal by equalizing the plurality of signals received in the plurality of antennas depending on one of the multiple paths, and
demodulating the transmission signal using the detected symbol or the secondarily detected symbol.

10. The detecting method of a receiver as claimed in claim 9, wherein in the demodulating of the transmission signal, an error value of the detected symbol and an error value of the secondarily detected symbol are compared, and the transmission signal is demodulated using a symbol having a smaller error value.

11. The detecting method of a receiver as claimed in claim 8, wherein a sample signal for a first symbol of the transmission signal, from among first symbols of the plurality of signals received through the plurality of antennas is obtained, and the sample signal for the first symbol is obtained by the reflecting of the plurality of signals received in the other antennas in other symbols of the plurality of signals received.

12. The detecting method of a receiver as claimed in claim 11, wherein the plurality of sample signals are collected by combining every two of the plurality of signals received in the plurality of antennas.

13. The detecting method of a receiver as claimed in claim 12, wherein the plurality of sample signals for the first symbol ($x_1[1]$) of the transmission signal are collected using the first symbols $\{y_1[1]$ and $y_2[1]\}$ of two of the received signals in two of the antennas and parameters ($b_j$ and $c_j$) for the first symbol obtained by the reflecting of the signals received in the other antennas in the other symbols through the following Equations:

$$b_j = h_2[l_j]y_1 - h_1[l_j]y_2, \quad b_1[1] = 0, \quad j = 1, 2, \ldots, B$$

$$c_j[k] = \sum_{m=1}^{j-1} b_m[l_{j+1} - (l_m - l_1) + k - 1]$$

$$\tilde{x}[1] = h_1^*[l_1]y_1[1] + h_2^*[l_1]y_2[1] + \sum_{j=2}^{B} \alpha_j^* b_j[1] + \sum_{j=1}^{B-1} \beta_j^* c_j$$

$$\alpha_j^* = (h_2[l_j]h_1[l_1] - h_1[l_j]h_2[l_1])^*, \quad \beta_j^* = (-\alpha_j)^*$$

where k is a symbol index, B is the number of multiple paths, $h_i$ a channel gain of an i-th antenna of the plurality of antennas, and $l_j$ is a j-th path of the multiple paths, wherein k, B, i and j are integer.

14. The detecting method of a receiver as claimed in claim 8, further comprising removing the detected symbol from the plurality of signals received in the plurality of antennas, and repeating the collecting of the plurality of sample signals and the detecting of the symbol to detect a next symbol of the detected symbol.

* * * * *